United States Patent [19]

Oda

[11] Patent Number: 5,366,419
[45] Date of Patent: Nov. 22, 1994

[54] POWER TRANSMISSION DEVICE INCLUDING A LUBRICATED ELECTROMAGNETIC CLUTCH

[75] Inventor: Atsushi Oda, Tochigi, Japan

[73] Assignee: Tochigi Fuji Sangyo Kabushiki Kaisha, Japan

[21] Appl. No.: 7,513

[22] Filed: Jan. 22, 1993

[30] Foreign Application Priority Data

Jan. 22, 1992 [JP]  Japan .................. 4-008935

[51] Int. Cl.$^5$ ........................... F16H 57/04
[52] U.S. Cl. ........................ 475/160; 192/84 C; 192/113.34
[58] Field of Search ............... 475/159, 160; 192/113 BT, 113 LC, 84 C

[56] References Cited

U.S. PATENT DOCUMENTS

| | | | |
|---|---|---|---|
| 2,622,699 | 12/1952 | Mills . | |
| 4,106,606 | 8/1978 | Cory | 192/113 BT OR |
| 4,319,499 | 3/1982 | Sanui et al. | 475/159 X |
| 4,442,729 | 4/1984 | Hayakawa . | |
| 4,625,584 | 12/1986 | Onodera | 475/160 OR |
| 4,644,815 | 2/1987 | Wawano et al. . | |
| 4,825,725 | 5/1989 | Premiski et al. | 475/159 OR |
| 4,958,712 | 9/1990 | Suganuma et al. | 192/84 C X |
| 4,987,974 | 1/1991 | Crouch . | |
| 5,004,073 | 4/1991 | Grimm | 475/159 X |
| 5,078,248 | 1/1992 | Yesnik | 192/84 C OR |

FOREIGN PATENT DOCUMENTS

| | | |
|---|---|---|
| 0216318 | 4/1987 | European Pat. Off. . |
| 0365794 | 5/1990 | European Pat. Off. . |
| 0409610 | 1/1991 | European Pat. Off. . |
| 63-97424 | 4/1988 | Japan . |
| 1-204827 | 8/1989 | Japan . |
| 2041480 | 9/1980 | United Kingdom . |

*Primary Examiner*—Dirk Wright
*Attorney, Agent, or Firm*—Graham & James

[57] ABSTRACT

Oil is enclosed in a casing. A power transmitting section and an electromagnetic clutch are contained in the casing. The electromagnetic clutch has an electromagnet fixed to the casing. An oil sump is formed adjacent to the electromagnetic clutch. An oil gutter collects the splashed oil splashed by centrifugal force from the power transmitting section and the electromagnetic clutch and directs the collected oil into the oil sump. The power transmitting section has an oil path for introducing the oil from the oil sump, directing the oil to an area in the vicinity of the electromagnetic clutch, and supplying the oil to the electromagnetic clutch by means of the centrifugal force.

8 Claims, 4 Drawing Sheets

POWER TRANSMISSION DEVICE INCLUDING A LUBRICATED ELECTROMAGNETIC CLUTCH

BACKGROUND OF THE INVENTION

This invention relates to a power transmission device for use in a vehicle and the like.

A drive power distribution control device for a vehicle is disclosed in Japanese Patent Laid Open No. 204827/1989. A transfer case is disclosed in Japanese Patent Laid Open No. 97425/1988. The inventions described in these publications are both directed to a transfer for distributing drive power generated by an engine to front and rear wheels in an automobile of a four-wheel drive type. The transfer includes a limit slip differential (LSD) mechanism. The limit slip differential mechanism disclosed in the former publication comprises a multiple-disk clutch actuated by a hydraulic actuator which is supplied with a hydraulic pressure from an oil pump driven by the engine. The limit slip differential mechanism disclosed in the latter publication comprises an electromagnetic multiple-disk clutch.

In the transfer described in each publication, lubricating points at a bearing section and a power transmitting section such as a gear engagement portion and a clutch portion are distributed along an axial direction. In order to supply oil to those widespread lubricating points, use has been made of a method of directing the oil through an oil gutter to each section and making the oil flow down. With this method, the oil is splashed by centrifugal force. This results in insufficient lubrication.

The former publication teaches to carry out forced lubrication wherein the oil is circulated from the oil pump through an oil path formed in a shaft to each lubricating point. In this event, the engine is inevitably suffered from power loss due to necessity of pressurization of the lubricating oil and due to an increased weight resulting from installation of the oil pump. Consequently, fuel efficiency is decreased.

The latter publication describes a function of eliminating abrasion dust which is produced from a friction plate or a gear engagement portion and scattered in the oil. Specifically, the abrasion dust is attracted by an electromagnet and removed from the oil. However, the splashed oil directly strikes the electromagnet. In this event, the abrasion dust once attracted may possibly be returned back into the oil. Furthermore, since the electromagnet and the splashed oil are brought into contact with each other for a very short time interval, the oil has little effect in cooling the electromagnet.

SUMMARY OF THE INVENTION

It is an object of this invention to provide a power transmission device with an electromagnetic clutch, which is capable of fully lubricating each section without the use of an oil pump, eliminating abrasion dust scattered in oil, and effectively cooling an electromagnet and which is light in weight and therefore cause no substantial load imposed on an engine.

In order to accomplish the above-mentioned object, this invention provides a power transmission device comprising:

a casing In which oil is enclosed;

a power transmitting section contained in the casing;

an electromagnetic clutch for controlling the power transmitting section, the electromagnetic clutch having an electromagnet fixed to the casing;

an oil sump adjacent to the electromagnet; and an oil gutter for collecting the splashed oil splashed by centrifugal force from the power transmitting section and the electromagnetic clutch to direct the collected oil into the oil sump;

wherein the power transmitting section has an oil path for introducing the oil from the oil sump, directing the oil to an area in the vicinity of the electromagnetic clutch, and supplying the oil to the electromagnetic clutch by means of the centrifugal force.

With the above-mentioned structure, the oil enclosed in the casing is splashed to the oil gutter by the electromagnetic clutch and the power transmitting section. The oil is directed through the oil gutter to the oil sump adjacent to the electromagnet. The oil collected in the oil sump is guided to the area in the vicinity of the electromagnetic clutch through the oil path formed in a shaft portion of the power transmitting section. By the centrifugal force, the oil is supplied to each lubricating point in the electromagnetic clutch and the power transmitting section. After lubrication is performed, the oil is discharged out by means of the centrifugal force.

Thus, an oil circulation path is formed through which the oil collected by the oil gutter is directed via the oil sump to an axial core of the shaft portion of the power transmitting section, supplied to each lubricating point in the electromagnetic clutch and the power transmitting section, and discharged out. As a result, sufficient lubrication is achieved without the use of an oil pump. In addition, it is possible to avoid power loss and an increased weight. This improves the fuel efficiency.

Since the oil sump is formed adjacent to the electromagnet, magnetic abrasion dust contained in the oil can effectively be attracted by the electromagnet and eliminated from the oil while the oil is in the oil sump. In addition, the electromagnet is fully cooled by the oil. Since the oil in the oil sump is not directly agitated by the splashed oil, the abrasion dust thus attracted never returns back into the oil. The oil sump is readily formed by the use of the electromagnet at a stationary side.

DESCRIPTION OF THE PREFERRED EMBODIMENT

Figure 1:
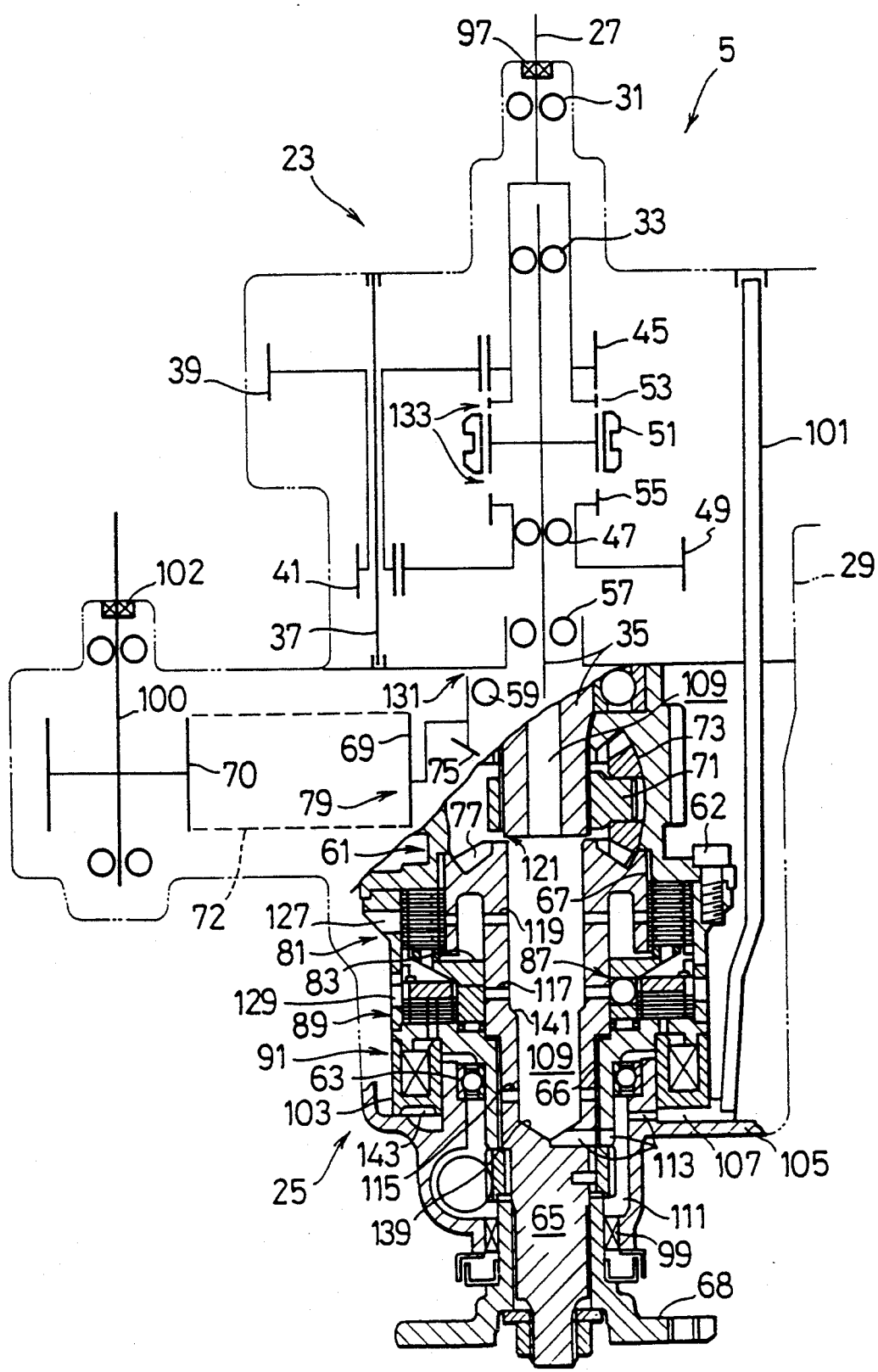
FIG. 1 shows a power transmission device according to an embodiment of this invention with a part illustrated in a skeleton diagram and another part illustrated in a sectional view.
Figure 2:
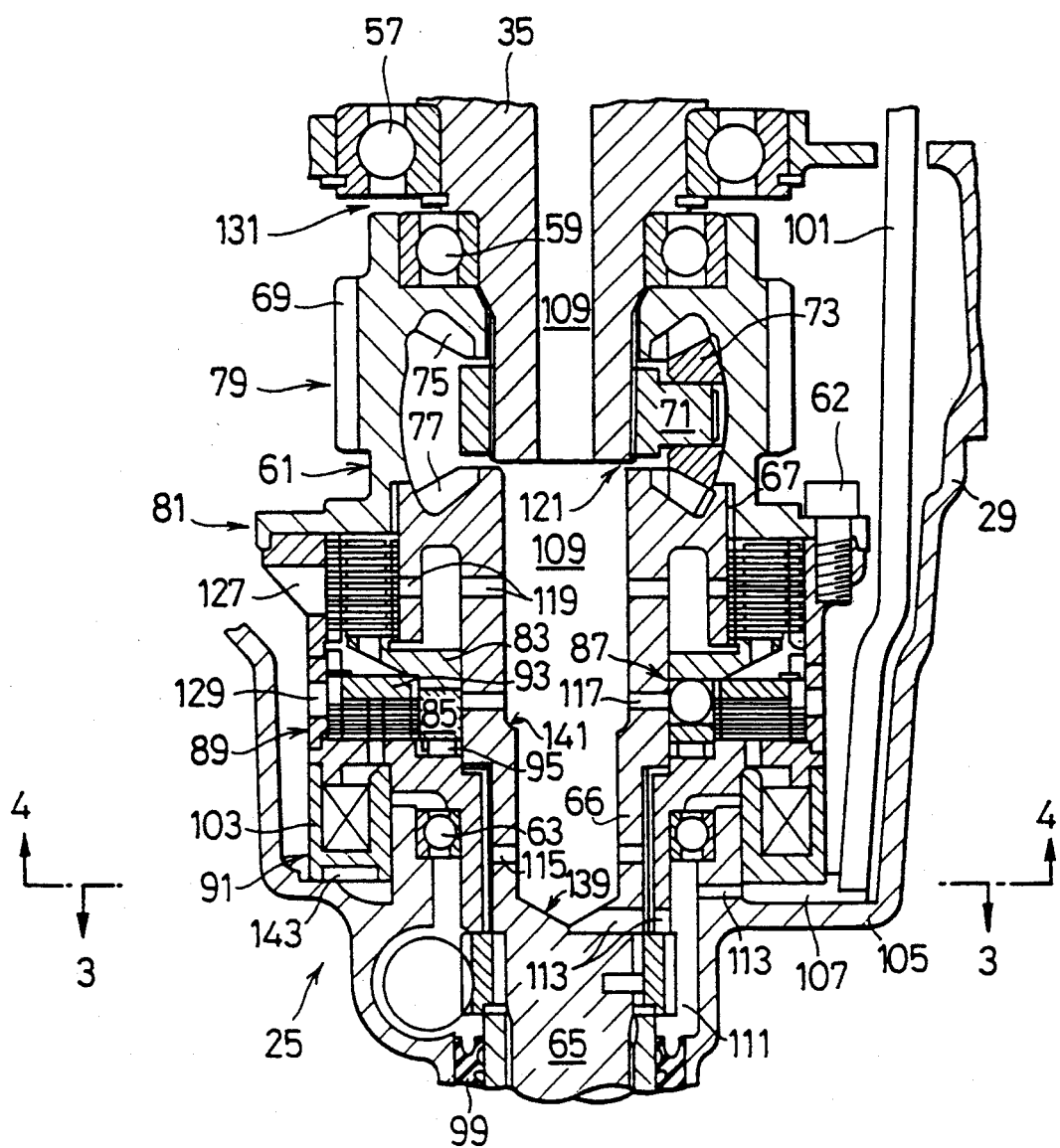
FIG. 2 is an enlarged sectional view of the part illustrated in the sectional view in FIG. 1.
Figure 3:
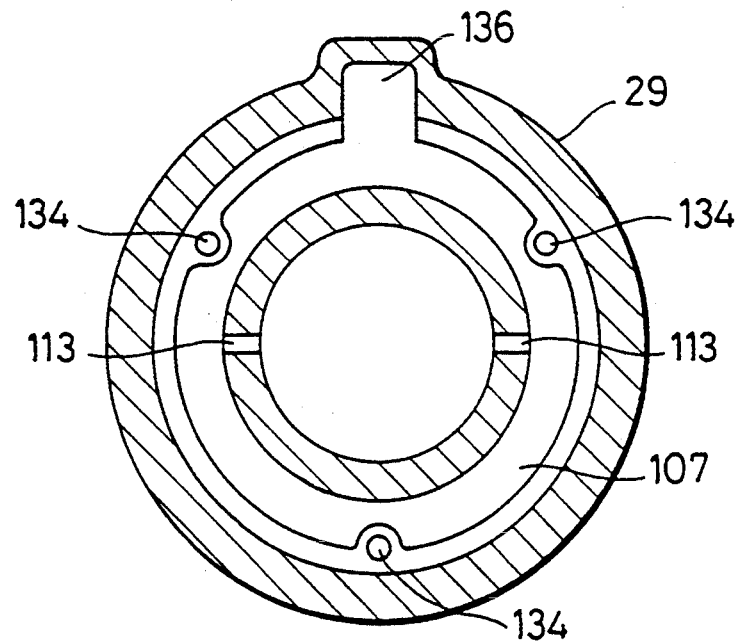
FIG. 3 is a sectional view of a casing taken along a line 3—3 in FIG. 2.

Referring to FIGS. 1 through 5, description will be made as regards a power transmission device according to an embodiment of this invention. FIG. 1 shows the power transmission device while FIG. 3 shows a power system of a vehicle using the power transmission system. In the following description, the upper side In each of FIGS. 1 and 2 corresponds to the forward side (the upper side in FIG. 5) of the vehicle. The right side in each of FIGS. 1 and 2 corresponds to the upper side in the gravitational direction. Other components with no reference numerals are not shown in the figure.

Figure 5:
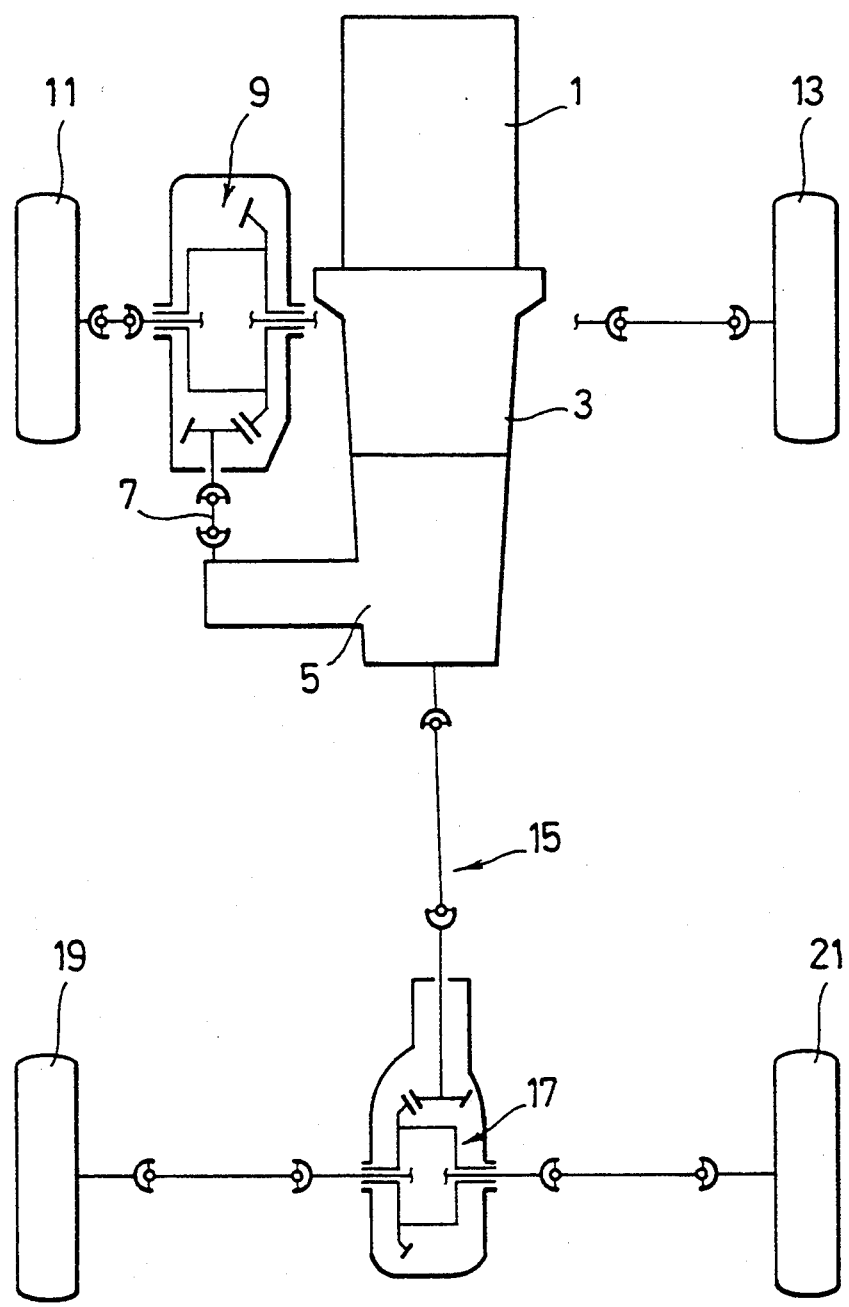
FIG. 5 is a skeleton diagram of a power system of a vehicle on which the power transmission device illustrated in FIG. 1 is mounted.

At first referring to FIG. 5, a structure of the power system will be described.

The power system comprises an engine 1, a main transmission S, a transfer 5 (the power transmission device according to this embodiment), a front wheel propeller shaft 7, a front differential unit (a front wheel differential unit) 9, left and right front wheels 11 and 13, a rear wheel propeller shaft 15, a rear differential unit (a rear wheel differential unit) 17, and left and right rear wheels 19 and 21.

A drive power generated by the engine 1 is distributed from the main transmission 3 through the transfer 5 to the front and the rear differential units 9 and 17. The drive power is then distributed through the front and the rear differential units 9 and 17 to the left and the right front wheels 11 and 13 and the left and the right rear wheels 19 and 21, respectively.

As illustrated in FIG. 1, the transfer 5 comprises a subsidiary transmission 23 and a center differential unit (a differential unit located between the front and the rear wheels) 25.

The subsidiary transmission 23 is a speed converter mechanism for switching output rotation of the main transmission 3 between two stages, namely, between high speed rotation and low speed rotation. A hollow input shaft 27 coupled to an output shaft of the main transmission 3 is inserted into a forward end of a transfer case (casing) 29 and is supported on the transfer case 29 through a bearing 31. A forward end of a coupling shaft 35 is supported in a hollow portion of the input shaft 27 through a bearing 33.

Below the input shaft 27, a countershaft 37 is supported on the transfer case 29. A large gear 39 and a small gear 41, which are formed In an integral fashion, are supported on the countershaft 37 through bearings. The input shaft 27 is provided with a gear 45. A gear 49 is supported on the coupling shaft 35 through a bearing 47. The large gear 39 is engaged with the gear 45 while the small gear 41 is engaged with the gear 49. Rotation of the input shaft 27 is decelerated through gear trains comprising the gears 39 and 45 and the gears 41 and 49.

A coupling sleeve 51 is fitted to the coupling shaft 35 to be movable in forward and backward directions. The gears 45 and 49 are integral with gears 53 and 55 engageable with the coupling sleeve 51, respectively. A shift lever penetrating through an upper part of the transfer case 29 is operable to move the coupling sleeve 51 along an axial direction.

When the coupling sleeve 51 is moved forwardly from a position illustrated in FIG. 1 add brought into engagement with the gear 53, the drive power of the engine 1 is transmitted through the coupling sleeve 51 to the coupling shaft 35 at a same speed. When the coupling sleeve 51 is moved backwardly from the position illustrated in FIG. 1 and brought into engagement with the gear 55, the drive power of the engine 1 is decelerated through the above-mentioned gear trains and transmitted to the coupling shaft 35. When the coupling sleeve 51 is kept at the position illustrated in FIG. 1, the coupling sleeve 51 is not brought into engagement with either one of the gears 53 and 55 so that the drive power of the engine 1 is shut off.

The coupling shaft 35 is supported on the transfer case 29 through a bearing 57 and in turn supports a forward end of a rotary case 61 through a bearing 59. The rotary case 61 is integrally formed through a bolt 62 and has a rear end supported on the transfer case 29 through a bearing 63. A rear wheel output shaft 65 penetrates through the rear ends of the rotary case 61 and the transfer case 29. The rear wheel output shaft 65 is supported on the rotary case 61 through bearings 66 and 67 and coupled to the rear wheel propeller shaft 15 through a flange member 68. The rotary case 61 is provided with a sprocket 69. The sprocket 69 is coupled through a chain 72 to other sprocket 70 coupled to the front wheel propeller shaft 7.

A pinion shaft 71 is integrally coupled to the coupling shaft 35. A pinion gear 73 is rotatably supported on the pinion shaft 71. The pinion gear 73 is engaged with a pair of side gears 75 and 77 to form a differential mechanism 79. The forward side gear 75 is formed on the rotary case 61 while the rearward side gear 77 is formed on the output shaft 65.

The drive power of the engine 1 is supplied through the subsidiary transmission 23 to the coupling shaft 35 and is distributed through the pinion gear 73 and the side gears 75 and 77 to a front wheel side including the front wheels 11 and 13 and a rear wheel side including the rear wheels 19 and 21. When a difference in drive resistance arises between the front wheel side and the rear wheel side, the drive power is differentially distributed between the front wheel side and the rear wheel side by rotation and revolution of the pinion gear 73.

As Illustrated in FIG. 2 in an enlarged scale, a main clutch 81 of a multiple disk type is located between the rotary case 61 and the output shaft 65. The main clutch 81 is for coupling the rotary case 61 and the output shaft 65 and serves as an LSD (Limit Slip Differential). Rearwardly of the main clutch 81, a pressing member 83 is coupled to the output shaft 65 in a spline-Joint fashion. A cam ring 85 is located rearwardly of the pressing member 83. A ball cam 87 is formed between the cam ring 85 and the pressing member 83. A pilot clutch 89 (electromagnetic clutch) of a multiple disk type is located between the cam ring 85 and the rotary case 61 to connect the cam ring 85 and the rotary case 61. An electromagnet 91 of a ring shape is fixed to the transfer case 29 and attracts an armature 93 located between the pilot clutch 89 and the pressing member 83 to engage the pilot clutch 89.

When the pilot clutch 89 is engaged, the cam ring 85 is coupled to the rotary case 61. In this state, when differential rotation is generated between the rotary case 61 (at the front wheel side) and the output shaft 65 (at the rear wheel side), the differential torque is applied to the ball cam 87. The main clutch 81 is engaged by the cam force through the pressing member 83. The reactive cam force is supplied through a bearing 95 to the rotary case 61.

When the engaging force (slip) of the pilot clutch 89 is adjusted by the electromagnet 91, the cam force is changed. Consequently, the engaging force (slip) of the main clutch 81 is varied. Thus, the differential limiting force between the front wheel side and the rear wheel side can be controlled. When the engaging force of each of the clutches 81 and 89 is sufficiently large, the differential rotation is inhibited. On the other hand, when the engaging force is appropriately lessened, the differential rotation is allowed. When the pilot clutch 89 is released, the cam force is dissipated to release the main clutch 81. At this time, the differential rotation can be freely performed. Thus, the center differential unit 25 is formed.

Oil is enclosed in the transfer case 29 provided with a lower oil sump formed at its lower part. A seal 97 is interposed between the transfer case 29 and the input shaft 27. A seal 99 is interposed between the transfer case 29 and the flange member 68. A seal 102 is interposed between a support shaft 100 of the other sprocket and the transfer case 29. Oil leakage is prevented by these seals 97, 99, and 102. An oil gutter 101 is attached to the transfer case 29 in an upper part thereof in a gravitational direction. The oil gutter 101 is downwardly inclined towards the rear side. An oil sump 107 is formed between a yoke 103 of the electromagnet 91 and a rear wall 105 of the transfer case 29. The oil in the lower oil sump is splashed by rotation of the gears 39, 41, 45, and 49 and the chain 72 and collected in the oil gutter 101. The oil flows down from a rear end of the oil gutter 101 to the oil sump 107.

An oil path (a second oil path) 109 is formed through the coupling shaft 35 and the output shaft 65 along their center axes. The bearing 63 is a shield type. An oil pool 111 is formed by the bearing 63 and the seal 99. An oil path (a first oil path) 113 is formed through the transfer case 29, the rotary case 61, and the output shaft 65 for communication between the oil sump 107 and the oil path 109 including the oil pool 111. The oil in the oil sump 107 is directed through the oil path 113 to the oil path 109. The oil path 109 is provided with oil paths 115, 117, 119, 121, and some other oil paths not shown in the figure (a third oil path, collectively) for supplying the oil by means of centrifugal force to lubricating points at the power transmitting section such as the ball cam 87, the clutches 81 and 89, the differential mechanism 79, the subsidiary transmission 23 as well as at the bearings. The oil after lubrication is discharged out through oil paths 127 and 129 formed in the rotary case 61 and through axial slots 131 and 133 around the input shaft 27 and the coupling shaft 35 (a fourth oil path, collectively) and is returned back to the lower oil sump at the lower part of the transfer case 29. FIG. 3 is a sectional view taken along a line 3—3 in FIG. 2. The reference numeral 134 represents a screw hole of a fastening bolt for fastening the electromagnet. The reference numeral 136 represents a recessed portion for insertion of the oil gutter 101.

Through an oil circulation path thus formed, an abundance of the oil is supplied to each lubricating point so that sufficient lubrication and cooling is carried out. The clutches 81 and 89, which particularly require a great abundance of the oil, are located in the vicinity of the oil sump 107. In addition, tapered portions 139 and 141 are formed in the oil path 109 at the side of the output shaft 65 to expedite the oil flow. Accordingly, the clutches 81 and 89 are supplied with a great abundance of the oil. The oil in the oil sump 107 serves to effectively cool the electromagnet 91. The oil sump 107 is readily formed by the use of the electromagnet 91 at the stationary side. Unlike the prior art, no oil pump is used for oil supply. Accordingly, power loss of the engine and increase in weight are avoided. This results in improvement of the fuel efficiency.

Figure 4:
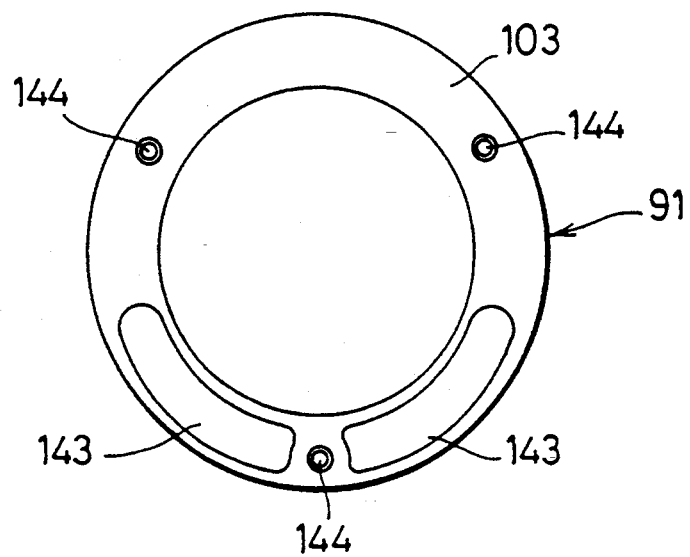
FIG. 4 is a sectional view of an electromagnet taken along a line 4—4 in FIG. 2.

The lower part of the yoke 103 of the electromagnet 91 is provided with a recessed portion 143 for communication with the oil sump 107 and is therefore formed into a thin portion of a reduced thickness. As shown in FIG. 4, the recessed portion 143 is formed in a part of the yoke 103 in a circumferential direction. The reference numeral 144 represents a screw hole of the fastening bolt for fastening the electromagnet. Magnetic abrasion dust contained in the oil sump is attracted by magnetic flux concentrated on the thin portion and removed therefrom. The magnetic abrasion dust is collected in the recessed portion 143 while the oil becomes clean. Since the oil collected in the recessed portion 143 is not agitated by the splashed oil, the abrasion dust once attracted is never returned back into the oil.

Thus, the transfer 5 is formed.

In the vehicle illustrated In FIG. 3, even if one of the front or the rear wheels is idled, for example, in a rough road, the drive power is transmitted to another wheel by the differential limiting function of the center differential unit 25. Thus, the road ability is improved. When the differential limiting force is Increased, the differential rotation between the front and the rear wheels is strictly limited. This improves the stability in straight running. When the differential limiting force is appropriately lessened, smooth and stable turning is provided.

As described above, it is possible to achieve sufficient lubrication of each lubricating point such as the clutches 81 and 89 as well as sufficient cooling of the electromagnet 91. In addition, the abrasion dust contained in the oil is effectively eliminated. This results in increased durability against high-level limit slip differential mode run and high speed rotation.

It is noted here that the power transmission device according to this invention is not restricted to the transfer. The electromagnetic clutch may be a single individual electromagnetic clutch instead of the pilot clutch for engaging the main clutch as described in the foregoing embodiment.

What is claimed is:

1. A power transmission device comprising:
   a casing in which oil is enclosed;
   a power transmitting section contained in said casing;
   an electromagnetic clutch for controlling said power transmitting section, said electromagnetic clutch having an electromagnet fixed to said casing;
   an oil sump adjacent to said electromagnet; and
   an oil gutter for collecting oil splashed by centrifugal force from said power transmitting section and said electromagnetic clutch and to direct the collected oil into said oil sump;
   wherein said power transmitting section has an oil path for introducing oil from said oil sump, directing the introduced oil to an area about said electromagnetic clutch, and supplying the introduced oil to said electromagnetic clutch by means of the centrifugal force.

2. A power transmission device as claimed in claim 1, wherein said oil path includes a first oil path for introducing the oil from said oil sump; a second oil path for directing the oil from said first oil path to an area in the vicinity of said electromagnetic clutch; a third oil path for supplying the oil from said second oil path to said electromagnetic clutch by the centrifugal force; and a fourth oil path for discharging the oil from said electromagnetic clutch.

3. A power transmission device comprising:
   a casing in which oil is enclosed;
   a power input shaft contained in said casing;
   a first power output shaft contained in said casing;
   a second power output shaft contained in said casing;
   a differential unit for generating differential rotation between said first and said second power output shafts;
   an electromagnetic clutch for limiting the differential rotation between said first and said second power output shafts, said electromagnetic clutch having an electromagnet fixed to said casing, said electromagnet having a yoke;

an oil sump adjacent to said yoke; and an oil gutter for collecting oil splashed by centrifugal force from said first and said second power output shafts, said differential unit, and said electromagnetic clutch and directing the collected oil into said oil sump;

wherein said first power output shaft has an oil path for introducing oil from said oil sump, directing the introduced oil to an area about said electromagnetic clutch, and supplying the introduced oil to said electromagnetic clutch by means of the centrifugal force.

4. A power transmission device as claimed in claim 3, wherein said oil path comprises a first oil path for introducing the oil from said oil sump; a second oil path for directing the oil from said first oil path to an area in the vicinity of said electromagnetic clutch; and a third oil path for supplying the oil from said second oil path to said electromagnetic clutch by the centrifugal force; said second power output shaft having a fourth oil path for discharging the oil from said electromagnetic clutch by means of the centrifugal force.

5. A power transmission device as claimed in claim 4, wherein said first oil path extends along a radial direction of said first power output shaft; said second oil path extending in said first power output shaft along an axial direction; said third oil path extending along said radial direction of said first power output shaft; said fourth oil path extending along a radial direction of said second power output shaft.

6. A power transmission device as claimed in claim 3, wherein said second power output shaft has a rotary case extending along an outer periphery of said first power output shaft, said electromagnetic clutch being located between said rotary case and said first power output shaft.

7. A power transmission device comprising:

a casing in which oil is enclosed;

a power input shaft contained in said casing;

a first power output shaft contained in said casing;

a second power output shaft contained in said casing and having a rotary case extending along an outer periphery of said first power output shaft;

a differential unit for producing differential rotation between said first and said second power output shafts;

an electromagnetic clutch arranged between said first power output shaft and said rotary case of said second power output shaft for restricting the differential rotation between said first and said second power output shafts, said electromagnetic clutch having an electromagnet fixed to said casing, said electromagnet having a yoke;

an oil sump adjacent to said yoke; and an oil gutter for collecting oil splashed by centrifugal force from said first and said second power output shafts, said differential unit, and said electromagnetic clutch and directing the collected oil into said oil sump;

wherein said first power output shafts has a first oil path for introducing oil from said oil sump; a second oil path for directing the introduced oil from said first oil path to an area about said differential unit; and a third oil path for supplying the introduced oil from said second oil path to said electromagnetic clutch and said differential unit by centrifugal force; said second power output shaft having a fourth oil path for discharging oil from said electromagnetic clutch by means of the centrifugal force.

8. A power transmission device as claimed in claim 7, wherein said first oil path extends along a radial direction of said first power output shaft; said second oil path extending in said first power output shaft along an axial direction; said third oil path extending along said radial direction of said first power output shaft; said fourth oil path extending along a radial direction of said second power output shaft.

* * * * *